United States Patent [19]
Krumsiek et al.

[11] 3,750,613
[45] Aug. 7, 1973

[54] DEVICE FOR USE WITH LAND VEHICLES TO MAKE THE SAME AMPHIBIOUS

[75] Inventors: Uwe Krumsiek, Kassel; Wilfried Holscher, Vellmar, both of Germany

[73] Assignee: Rheinstahl AG, Essen, Germany

[22] Filed: Dec. 3, 1971

[21] Appl. No.: 204,531

[30] Foreign Application Priority Data
Dec. 17, 1970 Germany.................. G 70 46 610.3

[52] U.S. Cl................. 115/.5 R, 115/1 R, 114/.5 R
[51] Int. Cl................................................. B60f 3/00
[58] Field of Search ................................. 9/1 T, 1 R; 115/.5 A, 1 R, .5 R; 180/1 H, 9.26, 9.32, 9.28; 280/154.5; 114/40, 41

[56] References Cited
UNITED STATES PATENTS
2,390,747   12/1945   Straussler........................... 115/1 R
3,145,682   8/1964    Truffert et al...................... 114/121
2,909,791   11/1959   Malary, Jr......................... 114/66.5 F Primary Examiner—Milton Buchler
Assistant Examiner—E. R. Kazenske
Attorney—Walter Becker

[57] ABSTRACT

A device for making land vehicles amphibious, which includes a shield with holding means adapted to be mounted on the front side of the vehicle, said shield being so designed and mounted that in assembled condition it partly protrudes beyond and sticks out of the water through which the vehicle is to pass, while the shield with holding means is of a light-weight construction and peferably has an angle of incidence of 45° with regard to the longitudinal axis of the vehicle.

4 Claims, 5 Drawing Figures

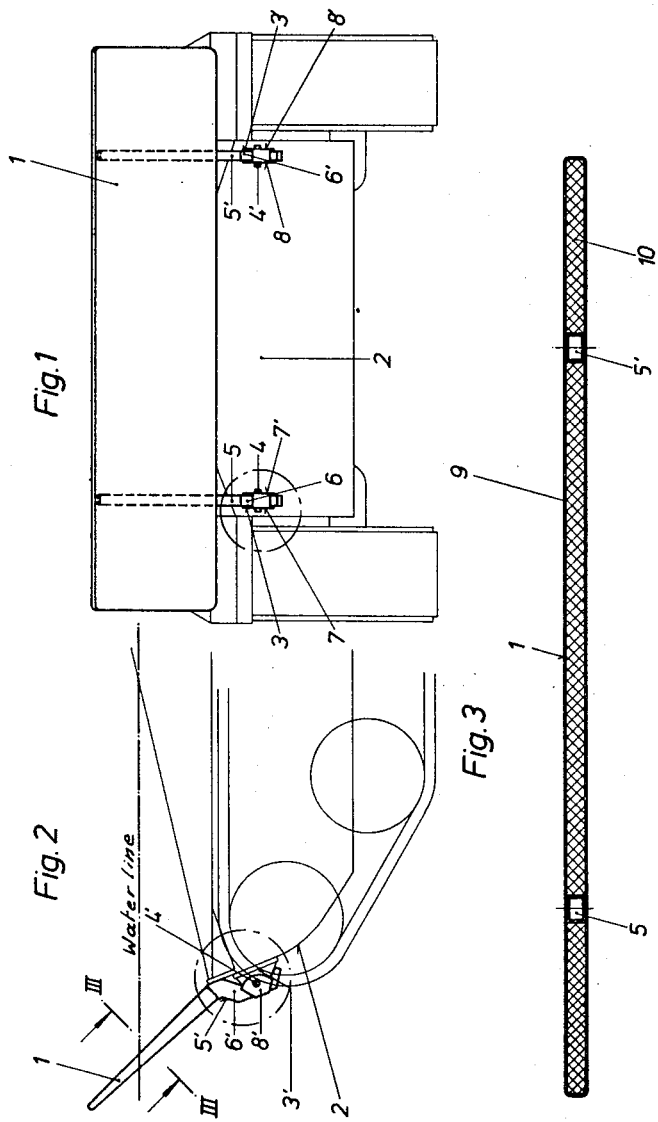

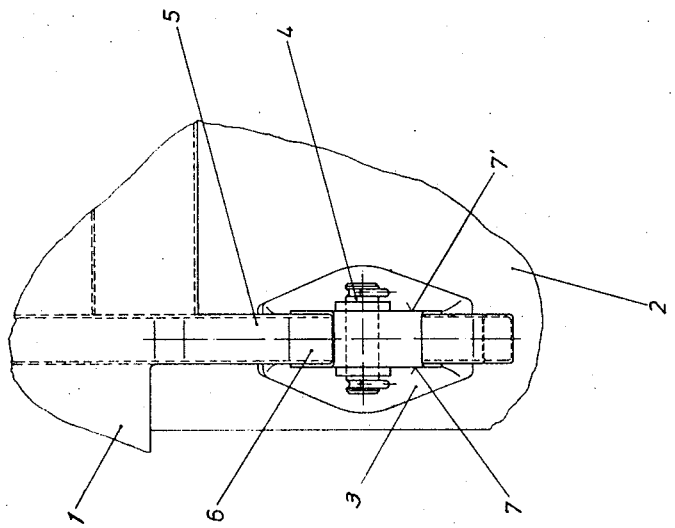
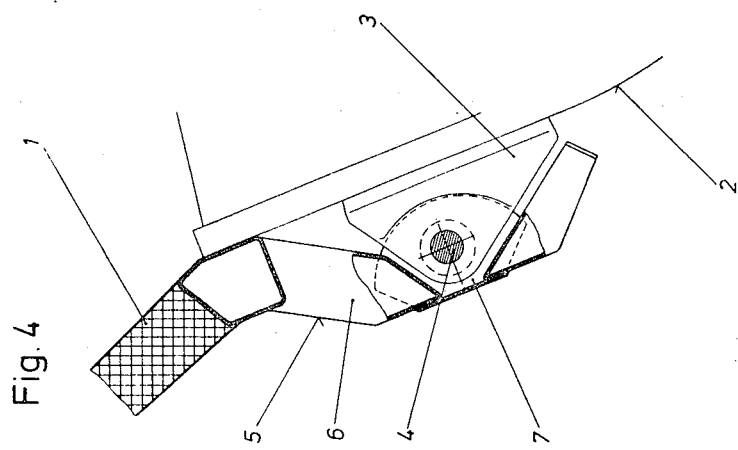

DEVICE FOR USE WITH LAND VEHICLES TO MAKE THE SAME AMPHIBIOUS

The present invention relates to a device for use with land vehicles to make the same amphibious, the device comprises primarily a so-called shield with a mounting constructed out of two support arms. This shield is attachable to that end of the vehicle which faces in the direction of travel, for crossing a body of water. The above mentioned device is intended especially for amphibious military vehicles, with which, while travelling through the water, the upper section of the shield juts out above the water level.

With such vehicles the outer surfaces are inclined in conformity with ballistic requirements, so that not only while driving the vehicle into the water but also while travelling through the water, because of high waves, that part of the vehicle which faces in the direction of travel will be flooded with water. As a result thereof, changes in the direction of pressure upon the vehicle walls occur, which walls are connected to the vehicle pan or vehicle hull, begin beneath the water level and rise to the vessel roof, which changes will eventually result in a sinking of the bow of the vehicle.

It has already been tried to control this bow heaviness of the vehicle as it occurs during water travel by use of various devices.

So-called inflatable pontoons or floats have been proposed which comprise a plurality of compartments and are made of a flexible material; these floats have special holding means which are insertable in mountings located on the vehicle. These floats are very bulky and have to be fastened to both sides of the vehicle for water travel. This bulky construction requires considerable space not only for storage but also during transport for the water travel.

In addition, it is known, for making armored track laying vehicles amphibious, to arrange a so-called swim shield on that end of the vehicle which faces in the direction of travel which shield is fastened to the vehicle below the water level by means of two support arms. However, these swim shield with their rigid supporting arms are very heavy, so that attaching and dismounting them to the vehicle with facilities available in the field can only be done with the expenditure of considerable time and energy.

It is an object of the present invention to so improve the above mentioned device that it may be quickly mounted and dismounted and easily handled and yet will exhibit the ruggedness necessary to withstand the stresses uccurring under extreme conditions.

This object and other objects and advantages of the invention will appear more clearly from the following specification in connection with the accompanying drawing, in which:

FIG. 1 shows a front view of a track-laying vehicle with the device according to the invention.

FIG. 2 shows a partial side view of FIG. 1 during water travel with the device according to the invention.

FIG. 3 is a detail of the shield according to the invention taken along the line III — III of FIG. 2.

FIG. 4 illustrates the dot-dash encircled portion of FIG. 2 on a larger scale than that of FIG. 2.

FIG. 5 is an enlargement of the dot-dash encircled part of FIG. 1.

The invention is characterized primarily in that the device is designed as a light weight construction and when in its position of operation on the bow of the vehicle will have an angle of incidence preferably of 45° to the longitudinal axis of the vehicle.

According to a further development of the invention, the shield has an outer layer of glass fiber reinforced polyester resins as well as a core of hard foam material, in which instance the two supporting arms are imbedded in the shield.

A further feature of the invention consists in that the two supporting arms comprise a preferably box-like profile and that the two arms are fastened to the towing hooks of the vehicle by means of cover plates and bolts on both sides of the arms.

Referring now to the drawing in detail, the device comprises a shield 1 with two supporting arms 5, 5' which are arranged on that end of a vehicle which faces the direction of travel. In this connection, the shield 1 is detachably connected by means of its two supporting arms 5, 5' to the towing hooks 3, 3' located on the bow 2 of the vehicle. The supporting arms 5, 5', which are arranged in parallel spaced relationship to each other, are imbedded in the shield 1, and on those ends 6, 6' which face away from the shield 1 the arms 5, 5' are provided on both sides with plates 7, 7'; 8, 8', by which, with bolts 4, 4', the arms 5, 5' can be secured to the towing hooks 3, 3'. In order that the device in its operative position will have a favorable angle of incidence of 45° to the longitudinal axis of the vehicle, the ends 6, 6' of the supporting arms 5, 5' are designed offset or cranked. The shield 1 has an outer layer 9 of polyester resin reinforced with glass fiber as well as a core 10 of hard foam material. The two supporting arms 5, 5' form a preferably box-like hollow profile.

The advantages realized by the invention consist especially in that the device, with high mechanical strength and low weight, may be attached or dismounted in a short time by two persons, and in that the vehicle experiences a bouyancy upon the bow when plunging into the water and while travelling in the water without being uncontrollably depressed into the water and flooded.

It is, of course, to be understood that the present invention is, by no means, limited to the particular showing in the drawing but also comprises any modifications within the scope of the appended claims.

What we claim is:

1. In combination with a land vehicle, a drive for making said land vehicle amphibious, which comprises: a shield, supporting arm means detachably connecting said shield to the front end face of said vehicle, said shield and said arm means being of a light weight construction and in assembled condition on said vehicle having an acute angle of incidence with regard to the longitudinal vehicle axis, the arrangement being such that said shield with the vehicle immersed in water extends out of the water, said vehicle being provided with towing ears, and said supporting arm means being hollow, connecting means being provided for connecting said supporting arm means to said towing ears.

2. The combination of claim 1, in which said angle of incidence is approximately 45°.

3. The combination of claim 1, in which said shield has an outer layer of glass fiber reinforced polyester resin, and a core of a hard foam material.

4. The combination of claim 1, in which said supporting arm means are embedded in said shield.

* * * * *